No. 630,957. Patented Aug. 15, 1899.
J. WERNER.
CHOCOLATE APPARATUS.
(Application filed Aug. 6, 1898.)
(No Model.)
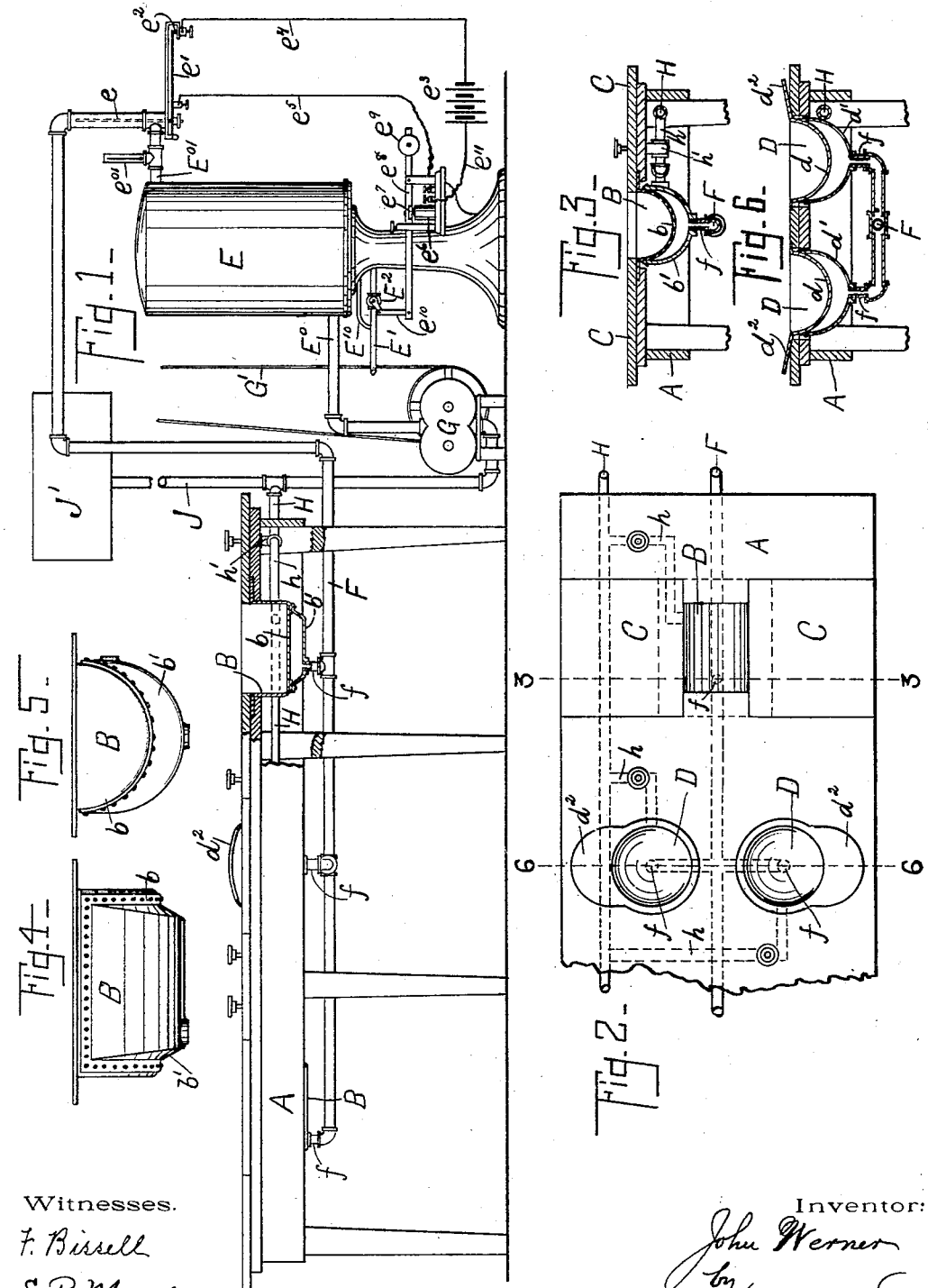
Witnesses.
F. Bissell
S. P. Moore
Inventor:
John Werner
by Osgood & Davis
Attorneys.

UNITED STATES PATENT OFFICE.

JOHN WERNER, OF ROCHESTER, NEW YORK.

CHOCOLATE APPARATUS.

SPECIFICATION forming part of Letters Patent No. 630,957, dated August 15, 1899.

Application filed August 6, 1898. Serial No. 687,942. (No model.)

*To all whom it may concern:*

Be it known that I, JOHN WERNER, a citizen of the United States, and a resident of Rochester, in the county of Monroe and State of New York, have invented certain new and useful Improvements in Chocolate Apparatus, of which the following is a specification.

This invention relates to chocolate apparatus, and particularly to apparatus for keeping the melted chocolate in a constant condition of fluidity, and in the embodiment of the invention set forth in this application is shown and described as applied to means for coating candies with chocolate or cocoa mixture.

In manufacturing chocolate candies, whether chocolate drops or candies coated with chocolate, it is essential for uniformity of product both in appearance, hardness, and in keeping qualities that the chocolate should be kept and manipulated while at a temperature of between 84° and 88° Fahrenheit. It is essential, too, that the chocolate should set quickly after it has been formed into the drop or has covered the candy. It should be hard in order that it should not be too easily damaged in the handling, and when used as a coating should form a dense cover for the candy in order that the interior mixture should not evaporate or tend to liquefy. It should be uniform in color in order that the product may show uniformity of manufacture. If the chocolate is mixed properly and is used at the temperature above stated, it will cool and harden quickly at a moderate temperature and the product will have the highest degree of hardness possible for chocolate, and its appearance will be a rich one of uniformly bright color and of good keeping quality. If, however, the chocolate is used when too warm, it will cool very slowly and the goods will have a dull grayish appearance, will not have an attractive appearance, the chocolate will not be as hard as it should be, and the keeping quality of the confection is not as great as that of chocolate when manipulated under the conditions above mentioned. Even goods of high grades when manipulated in such a manner as to produce a lack of uniformity of temperature will be inferior in the market to goods of much lower grade when manipulated under proper conditions.

Chocolate is first melted, and then should be cooled to about 86° Fahrenheit. At this temperature it should be stirred or "mixed" until it reaches its proper setting condition. If after having been thus stirred it is maintained at 84° to 88° Fahrenheit during further manipulation, it will keep in proper condition for use for a long time and when allowed to cool will set quickly and hard and with a good color, and the product is very uniform in color, keeping qualities, hardness, and in thickness of the coating. Unless these conditions are complied with, the chocolate may run after the dipping of a confection and during the cooling, and a variable and inferior product is the result.

Two methods of manipulating chocolate, either for making chocolate drops or tablets or for coating candies, are now employed. The first method is to keep a quantity of hot chocolate in a tank, supplying the tank from a mixing-kettle. The tank is set in a table upon which and adjacent to the tank is a marble slab. The operator takes a small quantity of the hot chocolate from the tank, places it on the slab, and stirs it with the hand until it is cooled in his judgment to the right degree, and then uses as much of it as he can until the chocolate is too cool for proper manipulation, whereupon more hot chocolate is added to the cooled chocolate upon the slab, and the operator stirs the cool and the hot chocolate together until the right temperature is reached. It is obvious that in this method of manipulating chocolate the chocolate in the tank must be kept hotter than is necessary, while the chocolate on the slab tends to become cooler than is necessary; and it is further obvious that the temperature of the chocolate at which it is to be manipulated is left wholly to the judgment of the operator. It is further obvious that much time is necessarily employed in mixing the fresh supply of the hot chocolate with the cooled chocolate on the slab, and that the temperature and therefore the qualities of the chocolate are constantly varying. The other method of manipulating chocolate is to place a large mass of hot chocolate in a pan and to stir it with a spatula or other instrument until it is sufficiently cool. Then a fork or other suitable instrument is used for dipping the candies into the chocolate for coating the same. In this case a large amount of chocolate must be mixed at one time, and when it congeals a considerable amount of time and labor is necessary to reheat it and to mix and stir it again to the right consistency.

The latter method of coating or dipping chocolate candies is employed by some manufacturers of candies; but the former method is much the cheaper and is in wider use.

The mixing and cooling of chocolate has heretofore required about one-third the time needed for the coating in the method first above described, and in the last-described method the loss of time is still greater.

In both of the methods above mentioned uniformity and perfection of product depends on the judgment of the operator, and even for low-grade goods necessitates skilled and correspondingly high-priced labor.

The object of this invention is to avoid the loss of time, loss of labor, and to employ less skilled and therefore cheaper operators than is possible under the two methods above mentioned.

In the drawings, Figure 1 is an elevation of a plant comprising my invention, a part thereof being shown in vertical section. Fig. 2 is a top plan of a portion of the dipping or coating table, showing two forms of dipping tank or kettle. Fig. 3 is a cross-section on the line 3 3 of Fig. 2. Figs 4 and 5 are respectively side and end elevations of the dipping-tank shown at the right in Fig. 2, and Fig. 6 is a cross-section on the line 6 6 of Fig. 2.

A is the operating-table.

B is one form of dipping-tank, which is set in the face of the table and is composed of the chocolate-receptacle $b$ and outer jacket or double bottom $b'$, there being a space between the kettle $b$ and the jacket $b'$. An inlet for fluid of suitable character is provided into the double bottom $b'$, preferably at about the highest portion of the space between the kettle and jacket. The fluid, therefore, may circulate through the jacket, and it may be steam, water, air, or other mobile fluid. Upon the face of the table and adjacent to the open kettle is a slab C, preferably of marble. The hot chocolate is taken from the kettle, is placed upon the slab C, and is there manipulated as desired and substantially in the manner above described. When chocolate cools upon the slab, it is scraped back into the kettle, and if the temperature of the fluid in the double bottom is kept uniform and the flow of fluid through the double bottom is sufficient to give off its heat freely to the kettle the chocolate in the kettle may be kept at a uniform temperature and may be used in small quantities upon the slab C. On the left-hand side in Fig. 2 is shown another form of dipping-kettle D, which is shown also in section in Fig. 6. This kettle is set upon the upper surface of the operating-table A, and consists in the kettle proper, $d$, the jacket $d'$ forming a double bottom between the kettle and the jacket for the circulation of fluid, as just described with reference to the kettle B, and provided with like inlet and outlet. The kettle $d$ is, like the kettle $b$, of heat-conducting material—such as iron, steel, or copper—and is provided with a flange or lip $d^2$, which may be united to the kettle $d$ in such a manner that heat will be conducted from the kettle to the lip. The lip may be formed, as shown in the drawings, integral with the kettle. The lip $d^2$ will therefore be heated by conduction from the kettle or tank $d$, and its temperature will be substantially that of the kettle and of the chocolate in the kettle, and but slightly lower. The lip is preferably inclined to the surface of the table in order that the chocolate thereon, if fluid, may flow back into the kettle.

E is a suitable heater for the fluid, which is conducted to and through the double bottoms of the kettles above described. The form of this heater is immaterial, except that it must be capable of introduction into the circulation system leading to and from the kettles. It may be adapted to heat air or to produce steam or to heat water. In the present instance it is a water-heater adapted to be heated by gas. The gas-main $E'$, leading into the heater, is provided with a regulating-cock $E^2$, and the heater is provided with an inlet-pipe $E^0$ and an outlet-pipe $E^{0'}$. In the outlet-pipe $E^{0'}$ is a thermostat consisting of a rod of suitable metal $e$ inside the pipe and extending outside thereof and connected with an electrical contact-arm $e'$, adapted to make and break connection with a contact-point $e^2$. A battery $e^3$ or other suitable source of electrical power is connected with the contact-point $e^2$, as by the wire $e^4$. The contact-arm $e'$ is connected by the wire or electrical conductor $e^5$ with an electrical motor consisting in the present case of the electro magnet or magnets $e^6$ and the armature $e^7$. The armature $e^7$ is set upon the pivoted lever $e^8$, having a counterweight $e^9$ or other suitable device for moving the lever oppositely to the pull of the magnets $e^6$. The lever is also connected, as by the link $e^{10}$, with the operating-arm of the regulating-valve $E^2$. The battery $e^3$ is connected by the wire or conductor $e^{11}$ with the motor, so that the current flows from the battery through the conductor $e^{11}$, the electromagnets $e^6$, the conductor $e^5$, the contact-arm $e'$, and the conductor $e^4$.

In connection with the gas-inlet $E'$, leading to the gas-burner inside of the heater E, is a pilot-flame pipe $E^{10}$ in constant connection with the gas-inlet and independent of the cock $E^2$. A small flame constantly burns inside of the heater fed by the pipe $E^{10}$, and when the cock $E^2$ shuts off the flame to the heating-burner and the cock-main supplies gas to the burner the pilot-flame relights the gas at the burner. This pilot-flame construction and mode of operation are well known to those skilled in the art of gas management, and therefore need no further explanation. The outlet-pipe $E^{0'}$ continues past the thermostat $e$ and is connected with the distributing-main F. The inlet-pipe $E^0$ runs from a suitable pump G, shown in the present instance as a rotary pump, driven by the belt G' from a suitable driving-shaft. The pump G produces a positive or forced circulation; but other modes of producing this result are considered equivalents for the pump—such, for instance, as gravitation from the tank J'. The inlet to the pump is connected with a return-main H. The distributing-main F has a connection running therefrom to each of the double-bottomed chocolate-kettles. In the present instance these connections are short pipes $f\ f$, and in order that the distribution of the water to the various kettles should be uniform the interior cross-section of the distributing-pipe F is always equal to or greater than the sum of the internal cross-sections of the connecting-pipes $f$. The purpose of this arrangement is that the contracted orifices into the tanks composed of the pipes of small bore restricts the amount of fluid passing through the connections and tends to produce uniformity of jet or flow into the series of kettles, while if the connecting-pipes should be larger than described the flow would be greater through those nearest the inlet end of the supply-main and would be less through those farthest away, thus producing variable feed of the feeding fluid and a difference of temperature in the kettles. Each kettle has an outlet-orifice leading to the highest point of the space in the double bottom, and a connection consisting of a pipe $h$ leads from the double bottom to the return-main H. The return-main and the connecting-pipes $h$ are each of a sufficient diameter to give free outlet for the fluid from the double bottoms of the tanks. To the inlet of the return-pipe H, and therefore to the inlet to the pump G, there is connected a supply-pipe J from a supply-tank J'. If the fluid should by leakage or otherwise diminish in quantity, the supply is still kept constant by this means. The tank J' permits expansion of the water in the system and escape of air.

Suitable cocks $h'$, having handles extending to convenient position—as, for instance, above the table, as shown—are inserted in the outlet connections $h$ for regulating the flow of the fluid or for shutting it off.

In the outlet-pipe $E^{0'}$ is placed a thermometer $e^{0'}$ for determining the temperature of the outlet-water in order to set and regulate the operation of the thermostat and for other purposes.

The contact-arm $e'$ of the thermostat is normally out of contact with the contact-point $e^2$.

The operation of the device is as follows: The heater having been started the pump G is also started, forcing the water through the heater and through the circulation system, composed of the pipes $E^{0'}$, the supply-main F, the connections $f$, the double bottoms of the kettles, the outlet connections $h$, and the return-pipe H. This forced circulation is kept up by means of the pump. The kettles of course become heated to the temperature of the water passing through their double bottoms. If the supply of chocolate is now placed in any of the kettles through which heated water is circulating, the chocolate will be heated to the temperature of the water. The thermostat-bar E is of course heated to the same temperature as the water, and its length depends upon its temperature. If its temperature rises above the point to which it is regulated, it will lengthen and move the contact-arm $e'$ into contact with the contact-point $e^2$, which energizes the magnets $e^6$, pulls down the armature $e^7$ and arm $e^8$, turning the cock $E^2$, and shutting off the gas-supply to the heater. As soon, however, as the water passing the thermostat falls below the desired temperature the thermostat-bar $e$ shortens, breaks the contact between the arm $e'$ and the point $e^2$, deënergizes the magnets $e^6$, and the counter-weight $e^9$ reopens the gas-cock $E^2$, whereupon the pilot-flame of the pipe $e^{10}$ relights the burner and the heating of the water in the heater is again set up. It will thus be seen that by means of the thermostat a very delicate regulation of the heat of the water can be maintained, and in fact it is found that the temperature of the water can be maintained within one degree of the normal temperature for which the device is regulated. On account also of the forced circulation it is found that the water as it returns through the system to the heater can be so regulated that the water after supplying the heat to the kettles falls less than one degree in temperature from the water issuing from the heater. Thus a uniform heating of the chocolate in the kettles is produced. From the kettles having the lip $d^2$ the chocolate is taken out in small quantities, placed upon the lip, and there is manipulated as desired, whether for coating candies or otherwise, and by the use of small quantities and the conduction of heat into the lip the chocolate is kept at a very uniform temperature while being manipulated. On the slab C the chocolate of course falls in temperature while thereon, but when too much congealed may be scraped directly back into the kettle B and is there reheated for use.

What I claim is—

1. In a chocolate apparatus, a chocolate-kettle having a double bottom, a heating-tank, a circulation system connecting the heating-tank and the double bottom of the kettle, and means for automatically controlling the temperature of the fluid in said system, substantially as described.

2. In a chocolate apparatus, a chocolate-kettle having a double bottom, a heating-tank, a circulation system connecting the heating-tank and the double bottom of the kettle, means for automatically controlling the temperature of the fluid in said system, and means for positively moving the fluid through the circulation system, substantially as described.

3. The combination of a series of chocolate-kettles, each having a double bottom, a heating-tank, a distributing-main connecting with said tank, a series of inlet connections from the distributing-main, one to each double bottom, the interior cross-sectional areas of the distributing-main being at least equal to the sum of the cross-sectional areas of the connections to the double bottoms, and a series of connections from said double bottoms to said return-main, substantially as described.

4. In a chocolate apparatus, the combination of a chocolate-kettle having a double bottom, a system of pipes communicating with said double bottom for circulating fluid therethrough, means for producing a circulation of fluid in said pipes, and thermostatic mechanism for automatically regulating the temperature of the fluid in said pipes.

5. In a chocolate apparatus, the combination of a chocolate-kettle seated in an outer receptacle for a heating fluid, a circulation system including said receptacle, heating apparatus for heating the fluid in the circulation system, and thermostatic mechanism for automatically controlling the temperature of the fluid in the system.

JOHN WERNER.

Witnesses:
C. R. OSGOOD,
F. BISSELL.